Sept. 16, 1952          A. C. SUTTON          2,610,397
ASPARAGUS PICKER
Filed Jan. 29, 1947          2 SHEETS—SHEET 2
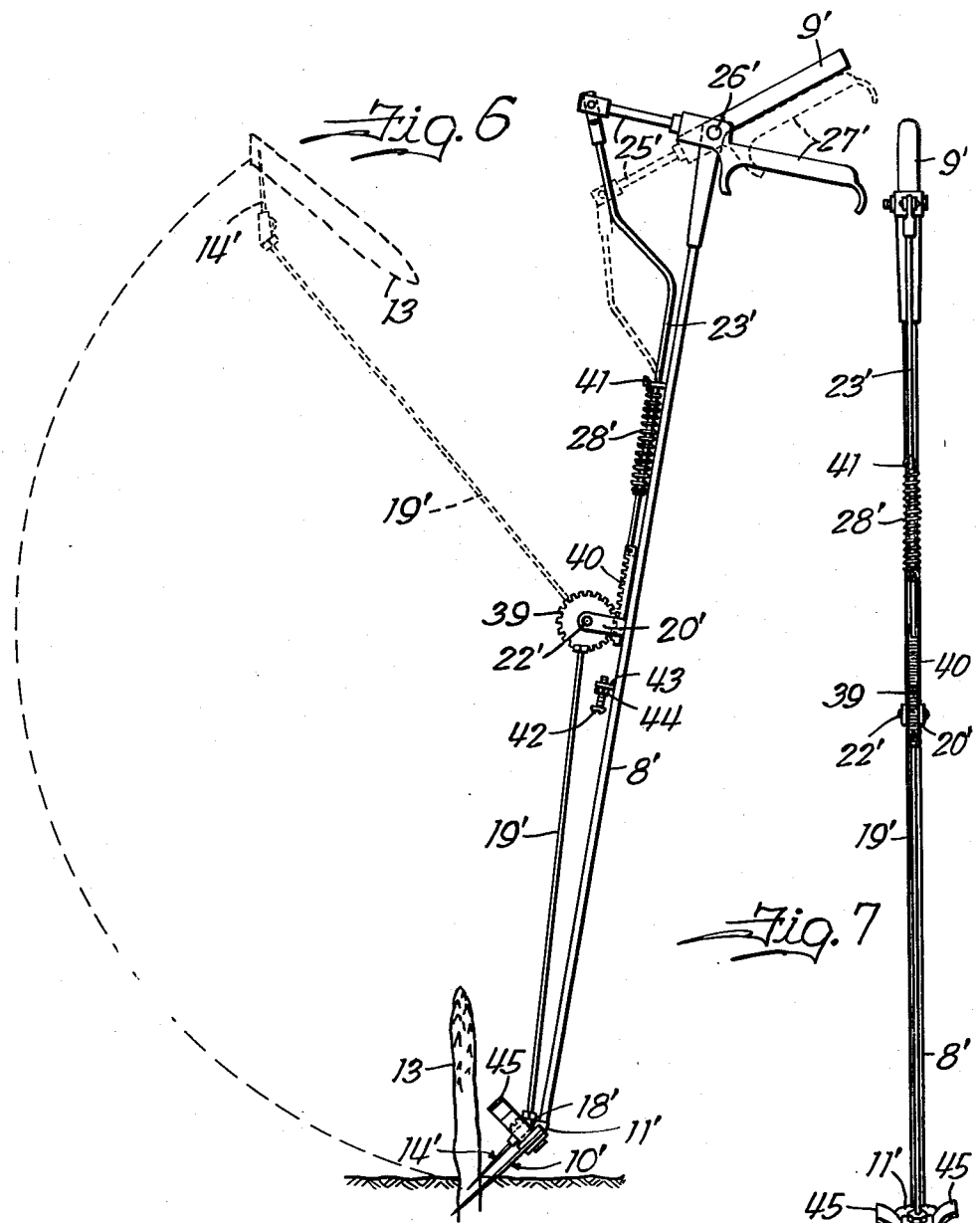
Inventor
Alton C. Sutton
Andrew F. Wintercorn
atty.

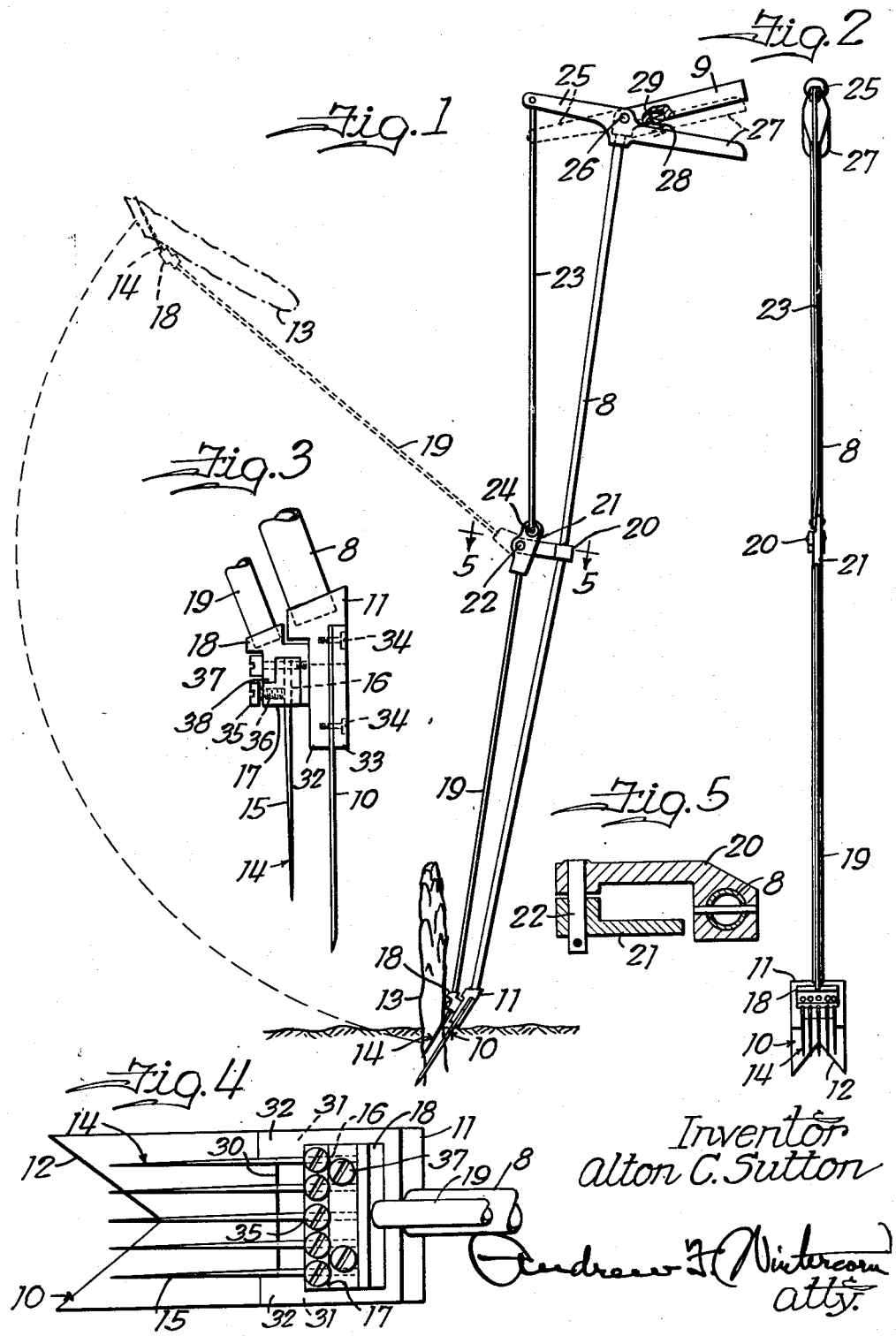

Patented Sept. 16, 1952

2,610,397

UNITED STATES PATENT OFFICE 2,610,397

ASPARAGUS PICKER

Alton C. Sutton, Rochelle, Ill.

Application January 29, 1947, Serial No. 724,978

20 Claims. (Cl. 30—124)

This invention relates to walking hand tools comparable to weeders, and actually usable as such, but more particularly designed and adapted for use in the harvesting of asparagus and the like.

The principal object of my invention is to provide a light hand tool that can be carried by a man or woman, or by a boy or girl, without fatigue, to cut and pick asparagus stalks without having to bend over, and without any necessity of stepping on or straddling the rows of asparagus, the present tool enabling doing this work with much greater efficiency than has been possible with any other known methods. The tool of my invention, generally speaking, comprises a stalk cutting blade which cuts the stalk at or slightly below ground level, and a fork which spears the stalk near the lower end in the cutting operation and has manually operable means for swinging it upwardly about a point approximately midway up the elongated handle so that the freshly cut stalk may be picked off the fork without any necessity for the operator stooping over to do so, the stalks being then placed in a basket or other container. A tool of this kind is, therefore, easily operable with one hand in the main operation, the other hand being used only to remove the stalks from the fork.

Another object of my invention is to provide a tool of the kind mentioned in which the rod carrying the fork is supported on a ball crank lever pivoted on a bracket mounted intermediate the ends of the handle shaft, the bell crank lever having attached to it a link operable by a lever pivoted on the handle for operation by the same hand that grips the handle. In a modified form, the rod carrying the fork is attached to a gear rotatably mounted on a bracket carried intermediate the ends of the handle shaft, this gear meshing with a rack that is reciprocable by means of a lever pivoted on the handle. In both forms, spring means is preferably provided to slow up the last portion of the rise of the fork and also help to start its return movement.

The invention is illustrated in the accompanying drawings, in which

Fig. 1 is a side view of an asparagus picker made in accordance with my invention, certain parts being shown in dotted lines in moved positions to better illustrate the operation;

Fig. 2 is a front view of the tool;

Fig. 3 is an enlarged side elevation of the knife and fork as they appear in Fig. 1;

Fig. 4 is a face view of Fig. 3;

Fig. 5 is a section on the line 5—5 of Fig. 1 on a larger scale;

Fig. 6 is a view similar to Fig. 1 showing another asparagus picker of modified or alternative construction, certain parts thereof being also shown in dotted lines in moved positions to better illustrate the operation, and Fig. 7 is a front view of the tool.

Similar reference numerals are applied to corresponding parts throughout the views.

Referring first to Figs. 1 to 5, the preferred form of tool comprises an elongated handle shaft 8 having a substantially horizontal rearwardly projecting handle 9 on the upper end, which is approximately at waist height for an operator of average height, so that the tool may be operated without any necessity for the operator stooping over. The weight of the entire tool, furthermore, is only approximately two pounds, so that there will be no likelihood of fatigue, and the tool can be easily operated by boys and girls, as well as by men and women. A knife blade 10 is mounted on a holder 11 carried on the lower end of the handle shaft 8 and has a V-shaped notch 12 in the lower end thereof, the edges of which are sharpened to cut through the standing stalks 13 of asparagus when the knife is thrust downwardly at approximately a 45° angle, as illustrated in Fig. 1. In the same thrust, a fork 14 is arranged to spear the butt end of the stalk about a half inch above the knife, the fork being normally disposed in spaced substantially parallel relation to the knife, as clearly appears in Figs. 1 and 3. The fork 14 is made up of a number of sharply pointed needles 15 mounted in spaced parallel holes 16 in a block 17 that is detachably secured to a holder 18 carried on the lower end of a rod 19 that extends normally upwardly in front of and substantially parallel to the handle shaft 8. A bracket 20 is suitably fixed to the handle shaft 8 approximately at the midpoint and has a bell crank lever 21 pivoted thereon at 22, one arm of which is rigidly attached to the upper end of the rod 19 and the other arm of which has a link 23 pivotally connected thereto at 24 to provide an operating connection between the fork 14 and a lever 25 that is pivotally mounted on the handle 9 at 26 and has a hand grip or trigger portion 27 arranged to be operated by the same hand gripping the handle 9.

The operation of the tool is clearly illustrated in Fig. 1. The operator holding only the handle 9 first thrusts the knife 10 downwardly at approximately a 45° angle to cut the asparagus stalk 13 at or slightly below ground level, and, in the same operation, the fork 14 spears the butt end of the stalk. The operator then takes hold of the hand trigger portion 27 of the lever 25 along with the handle 9, and by merely closing his hand to bring the trigger 27 into close proximity with the handle 9, a downward thrust is applied to the link 23 to swing the bell crank lever 21 in a clockwise direction so as to swing the fork 14 with the rod 19 upwardly through approximately 120°, as shown in dotted lines. The freshly cut stalk of asparagus is thus brought to a sufficient elevation, about hand height, pointing toward the operator, as clearly appears in dotted lines in Fig. 1, so that it may be removed from the fork with the left hand, assuming the operator uses the right hand in grasping the handle 9 and trigger 7. A left handed operator will usually use his right hand to remove stalks. It will, therefore, appear that I have provided a hand tool of a very practical and efficient type for the purpose contemplated. An operator working with this tool can cut more asparagus with much less fatigue and in less time than with other known methods. Operators working with ordinary knives soon complain of backache because of the amount of stooping required, and aside from that it is well known that there is a large percentage of loss with that method of harvesting asparagus because of the extent to which the plants are trampled under foot. With the present tool, there is no necessity for the operator walking on the row because the operation can easily be taken care of from along side the row, the sweep of the fork 14 being in an outward direction away from the row in lifting the cut-off stalks.

The tool may also be used as a weeder by lifting the fork 14 before the knife 10 is thrust into the ground. For dandelion digging, the fork can be left down to spear the plant at the roots, and the severed plant can then be lifted to hand height similarly as in the harvesting of asparagus.

A coiled compression spring 28 is indicated in Fig. 1 suitably secured in a recess 29 provided therefor in the underside of the handle 9. This spring is compressed between the handle 9 and trigger 27 in the last approximately 30° of upward movement of the fork 14 and serves a double purpose, namely, it slows up the fork in its final upward movement and also helps to start the fork downwardly back to the starting point, the greater portion of the return movement being by gravity.

The knife blade 10 has its butt portion cut away, as indicated at 30 in Fig. 4, leaving two side portions 31 to be clamped in the forked portion 32 of the holder 11 when a correspondingly forked back plate 33 that is suitably secured to the holder 11 by screws 34 is fastened in place. The opening 30 is important from the standpoint that it permits dirt and mud to work through the butt portion of the blade 10 instead of accumulating on the butt portion of the holder 18 of the fork 14 and necessitating scraping off periodically. Obviously, it is important that the holder 18 for the fork 14 be permitted to seat on the holder 11 of the blade 10, otherwise the needles of the fork 14 would not be in the proper closely spaced relationship to the blade 10 to spear the asparagus stalks properly on the butt ends. Incidentally, these butt ends are tough and are usually trimmed off later anyway as waste, so that the holes made by the needles 15 are not objectionable.

The block 17, in which the holes 16 are provided for the needles 15 of the fork 14, has screws 35 threaded in holes 36 provided therein in right angle relationship to the holes 16, so that each needle is held by a separate screw and the needles may be replaced individually. Other screws 37 threaded in the bifurcated portion 38 of the holder 18, into which the block 17 is fitted, serve to fasten the block 17 in place in the holder.

The tool shown in Figs. 6 and 7 is closely similar to that shown in Figs. 1 to 5, the principal difference being in the provision of a gear 39 rigidly attached to the upper end of the rod 19' carrying the fork 14', this gear being rotatably mounted, as indicated at 22', in a U-shaped bracket 20' carried on the handle shaft 8' intermediate the ends thereof, approximately at the midpoint. The gear 39 meshes with a rack 40 that is reciprocable relative to the bracket 20' by means of a rod 23' that is pivotally connected to a lever 25', which in turn is pivoted, as indicated at 26', to the handle 9' and operable by means of a hand trigger 27', similarly as in the operation of the other tool. In this tool, therefore, it will be seen that the blade 10' and fork 14' cooperate in substantially the same way as in the other tool in the cutting of a stalk 13 of asparagus, the stalk being speared by the fork 14' at the butt end and being lifted to approximately hand height by the fork when the operator closes his grip on the hand trigger 27'. The spring indicated at 28' is a tension spring secured to the rod 23' at its lower end and surrounding a portion of the rod intermediate the ends thereof and attached at its upper end to a projection 41 on the handle shaft 8'. An adjusting screw 42 is indicated mounted on a bracket 43 suitably secured to the handle shaft 8' below the bracket 20' and arranged to be adjusted to serve as a limiting stop for the rack 40. A lock nut 44 is provided for locking the screw 42 in an adjusted position relative to the bracket 43. The wings indicated at 45 projecting from the holder 11' of the blade 10' serve to guide the holder 18' of the fork 14' at the lower end of its travel to guide the fork 14' back to a mid position with respect to the notched lower end 12' of the blade 10'.

The operation of the tool of Figs. 6 and 7 is substantially the same as the other tool previously described.

It is believed the foregoing description conveys a good understanding of the objects and advantages of my invention. The appended claims have been drawn to cover all legitimate modifications and adaptations.

I claim:

1. A device of the class described comprising an elongated handle shaft, a knife fixedly mounted on the lower end of said shaft, a fork disposed in front of and substantially parallel to the knife and adapted to spear a standing stalk concurrently with the cutting through thereof by the knife, a support for said fork movable upwardly relative to said shaft to elevate the fork with the object speared thereon to the vicinity of the upper end portion of the shaft, and hand operable means on the upper end of the shaft operatively connected with said support to elevate the same.

2. A device of the class described comprising an elongated handle shaft, a knife fixedly mounted on the lower end of said shaft, a fork disposed in front of and substantially in parallel relation to the knife and adapted to spear a standing stalk, an elongated rod disposed in front of and substantially parallel to said handle shaft carrying said fork on its lower end and pivotally mounted at its upper end relative to the approximate middle portion of said shaft, and means operable by hand from the upper end of said shaft and operatively connected with the pivoted end portion of said rod for swinging said rod forwardly and upwardly relative to the shaft to elevate the fork to a delivery position near the upper end of the shaft.

3. A device of the class described comprising an elongated handle shaft, a knife mounted on the lower end of said shaft, a fork disposed in front of and substantially in parallel relation to the knife, an elongated rod in front of said handle shaft carrying said fork on its lower end and pivotally mounted at its upper end relative to an intermediate portion of said shaft, a bell crank on the pivoted upper end of said rod, a second rod pivotally connected to said bell crank and extending upwardly toward the upper end of the shaft, and means for reciprocating said second rod.

4. A device of the class described comprising an elongated handle shaft, a knife mounted on the lower end of said shaft, a fork disposed in front of and substantially in parallel relation to the knife, an elongated rod in front of said handle shaft carrying said fork on its lower end and pivotally mounted at its upper end relative to an intermediate portion of said shaft, a bell crank on the pivoted upper end of said rod, a second rod pivotally connected to said bell crank and extending upwardly toward the upper end of the shaft, a handle on the upper end of said shaft, and a lever pivoted thereon intermediate its ends and pivotally connected at one end to the upper end of the second rod and having its other end portion movable toward and away from the handle.

5. A device as set forth in claim 4, including spring means loaded in the pivotal movement of said lever in one direction.

6. A device of the class described comprising an elongated handle shaft, a knife mounted on the lower end of said shaft, a fork disposed in front of and substantially in parallel relation to the knife, an elongated rod in front of said handle shaft carrying said fork on its lower end and pivotally mounted at its upper end relative to an intermediate portion of said shaft, a gear in rigid relation to the pivoted upper end of said rod, and a rack meshing with said gear and manually reciprocable relative to said shaft to elevate the fork toward the upper end of said shaft.

7. A device of the class described comprising an elongated handle shaft, a knife mounted on the lower end of said shaft, a fork disposed in front of and substantially in parallel relation to the knife, an elongated rod in front of said handle shaft carrying said fork on its lower end and pivotally mounted at its upper end relative to an intermediate portion of said shaft, a gear in rigid relation to the pivoted upper end of said rod, a rack meshing with said gear and reciprocable relative to said shaft, a second rod connected to said rack and extending toward the upper end of said shaft, a handle on the upper end of said shaft, and a hand trigger pivoted on said handle and connected to the upper end of said second rod.

8. A device as set forth in claim 7, including spring means loaded in the pivotal movement of said trigger in one direction.

9. A device of the class described comprising an upright elongated handle shaft reaching from the ground to approximately hand height, a V-notched knife rigidly mounted on the lower end of said shaft inclined forwardly at approximately 45° to a vertical, a rigid handle projecting rearwardly from the upper end of said shaft, a bracket mounted on said shaft adjacent the midpoint of its length, a fork disposed in spaced substantially parallel relation to said knife in front of the same with its pointed end over the V-notch in the knife, a rod rigidly attached to said fork at one end and pivoted at its other end to said bracket, and means manually operable through a small distance by the hand on said handle and operatively connected to said rod with a motion-multiplying connection to swing the fork forwardly and upwardly to the vicinity of the upper end of said shaft.

10. A device of the class described comprising an upright elongated handle shaft reaching from the ground to approximately hand height, a V-notched knife rigidly mounted on the lower end of said shaft inclined forwardly at approximately 45° to a vertical, a rigid handle projecting rearwardly from the upper end of said shaft, a bracket mounted on said shaft adjacent the midpoint of its length, a fork disposed in spaced substantially parallel relation to said knife in front of the same with its pointed end over the V-notch in the knife, a rod rigidly attached to said fork at one end and pivoted at its other end to said bracket, a bell crank on the pivoted upper end of said rod, a second rod pivotally connected to said bell crank and extending upwardly toward the upper end of the shaft, and means for reciprocating said second rod.

11. A device of the class described comprising an upright elongated handle shaft reaching from the ground to approximately hand height, a V-notched knife rigidly mounted on the lower end of said shaft inclined forwardly at approximate 45° to a vertical, a rigid handle projecting rearwardly from the upper end of said shaft, a bracket mounted on said shaft adjacent the midpoint of its length, a fork disposed in spaced substantially parallel relation to said knife in front of the same with its pointed end over the V-notch in the knife, a rod rigidly attached to said fork at one end and pivoted at its other end to said bracket, a bell crank on the pivoted upper end of said rod, a second rod pivotally connected to said bell crank and extending upwardly toward the upper end of the shaft, and a hand trigger pivoted on said handle and pivotally connected to said second rod.

12. A device as set forth in claim 11, including spring means loaded in the pivotal movement of said trigger in one direction.

13. A device of the class described comprising an upright elongated handle shaft reaching from the ground to approximately hand height, a V-notched knife rigidly mounted on the lower end of said shaft inclined forwardly at approximately 45° to a vertical, a rigid handle projecting rearwardly from the upper end of said shaft, a bracket mounted on said shaft adjacent the midpoint of its length, a fork disposed in spaced substantially parallel relation to said knife in front of the same with its pointed end over the V-notch in the knife, a rod rigidly attached to said fork at one end and pivoted at its other end to said bracket, a gear in rigid relation to the pivoted upper end of said rod, and a rack meshing with said gear and manually reciprocable relative to said shaft to elevate the fork toward the upper end of said shaft.

14. A device of the class described comprising an upright elongated handle shaft reaching from the ground to approximately hand height, a V- notched knife rigidly mounted on the lower end of said shaft inclined forwardly at approximately 45° to a vertical, a rigid handle projecting rearwardly from the upper end of said shaft, a bracket mounted on said shaft adjacent the midpoint of its length, a fork disposed in spaced substantially parallel relation to said knife in front of the same with its pointed end over the V-notch in the knife, a rod rigidly attached to said fork at one end and pivoted at its other end to said bracket, a gear in rigid relation to the pivoted upper end of said rod, a rack meshing with said gear and reciprocable relative to said shaft, a second rod connected to said rack and extending toward the upper end of said shaft, and a hand trigger pivoted on said handle and connected to the upper end of said second rod.

15. A device as set forth in claim 14, including spring means loaded in the pivotal movement of said trigger in one direction.

16. A walking pickup hand tool of the class described comprising a pickup member carried on one end of an elongated rod, a handle shaft reaching from the operator's hand to the ground relative to the middle portion of which the other end of said rod is pivoted, and means manually operable from the upper end of said shaft and operatively connected with said rod for swinging the latter upwardly relative to the shaft from a lowered position to a delivery position in which the free end of the rod is disposed within the operator's reach from the upper end of the shaft.

17. A walking pickup hand tool of the class described comprising a pickup member carried on one end of an elongated rod, a handle shaft reaching from the operator's hand to the ground relative to the middle portion of which the other end of said rod is pivoted, a bell crank on the pivoted end of said rod, a second rod pivotally connected to said bell crank and extending upwardly toward the upper end of the shaft, and means for reciprocating said second rod.

18. A walking pickup hand tool of the class described comprising a pickup member carried on one end of an elongated rod, a handle shaft reaching from the operator's hand to the ground relative to the middle portion of which the other end of said rod is pivoted, a bell crank on the pivoted end of said rod, a second rod pivotally connected to said bell crank and extending upwardly toward the upper end of the shaft, a handle on the upper end of said shaft, and a hand trigger pivoted on said handle and pivotally connected to the upper end of said second rod to swing the first rod upwardly from a lowered position.

19. A walking pickup hand tool of the class described comprising a pickup member carried on one end of an elongated rod, a handle shaft reaching from the operator's hand to the ground relative to the middle portion of which the other end of said rod is pivoted, a gear in rigid relation to the pivoted upper end of said rod, and a rack meshing with said gear and manually reciprocable relative to said shaft to elevate the pickup member toward the upper end of said shaft.

20. A walking pickup hand tool of the class described comprising a pickup member carried on one end of an elongated rod, a handle shaft reaching from the operator's hand to the ground relative to the middle portion of which the other end of said rod is pivoted, a gear in rigid relation to the pivoted upper end of said rod, a rack meshing with said gear and reciprocable relative to said shaft, a second rod connected to said rack and extending toward the upper end of said shaft, a handle on the upper end of said shaft, and a hand trigger pivoted on said handle and connected to the upper end of said second rod.

ALTON C. SUTTON.

REFERENCES CITED

The following references are of record in the file of this patent:

UNITED STATES PATENTS

| Number | Name | Date |
|---|---|---|
| 96,134 | Morries | Oct. 26, 1869 |
| 938,759 | Green | Nov. 2, 1909 |
| 1,453,812 | Thomas | May 1, 1923 |
| 1,751,481 | Tourrette | Mar. 25, 1930 |
| 1,759,524 | Smith | May 20, 1930 |
| 2,033,431 | Krauter | Mar. 10, 1936 |
| 2,244,917 | Muller | June 10, 1941 |
| 2,322,926 | Dorland | June 29, 1943 |